May 21, 1935.  J. O. ALMEN  2,001,861

MEANS FOR TESTING LUBRICANTS

Filed Feb. 17, 1933  2 Sheets-Sheet 1

Inventor
John O. Almen

May 21, 1935.  J. O. ALMEN  2,001,861
MEANS FOR TESTING LUBRICANTS
Filed Feb. 17, 1933  2 Sheets-Sheet 2
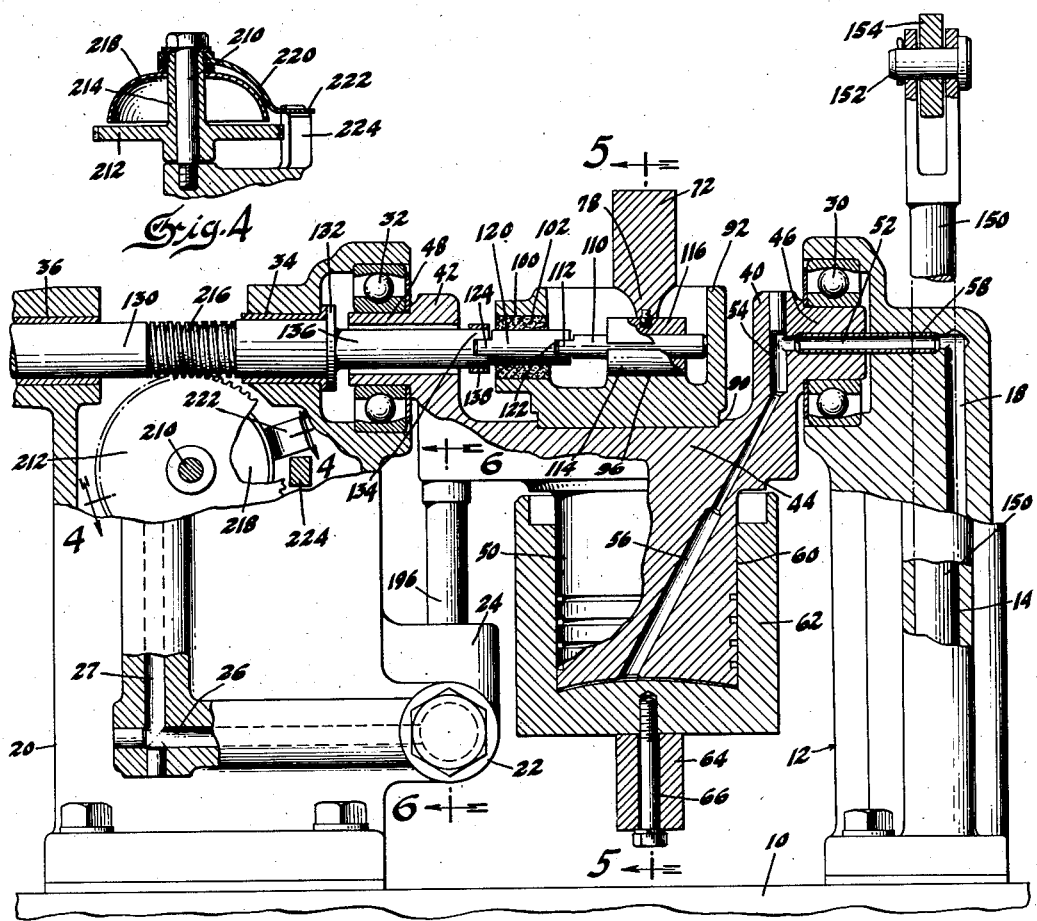
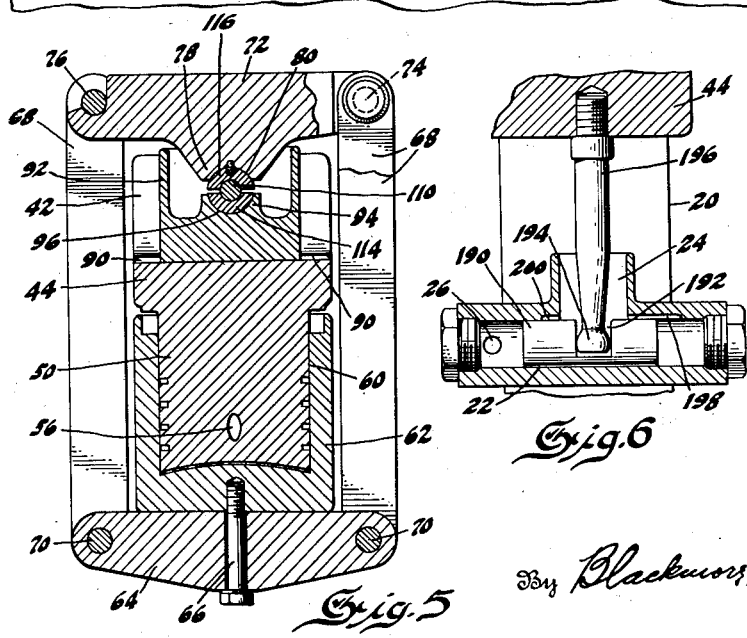
Inventor
John O. Almen
By Blackmore, Spencer & Flint
Attorneys Patented May 21, 1935

2,001,861

UNITED STATES PATENT OFFICE 2,001,861

MEANS FOR TESTING LUBRICANTS

John O. Almen, Royal Oak, Mich., assignor, by mesne assignments, to General Motors Corporation, Detroit, Mich., a corporation of Delaware Application February 17, 1933, Serial No. 657,211

12 Claims. (Cl. 265—10)

The invention herein described and claimed relates to apparatus for testing the lubricating properties of oils or other lubricants and especially for testing the capacity of oils to lubricate satisfactorily machine parts operating in rubbing contact under high loads.

The object of the invention is to enable the lubricating properties of a lubricant to be ascertained with facility and accuracy, and to enable different lubricants to be quickly and easily compared with respect to their relative fitness for use as lubricants in a given mechanism.

The invention consists in the combination, hereinafter described and claimed, of means for moving an element at a given velocity in rubbing contact with another element, means for yieldably resisting movement of the other element in the direction of movement of the moving element, means for applying predetermined quantities of force to press the rubbing surfaces of said elements together, means for maintaining lubricant, the properties of which are to be ascertained, on the rubbing surfaces, and means for measuring the force transmitted by the moving element to the other due to friction between the surfaces in contact.

In the accompanying drawings in which like parts are indicated by like reference characters, Figure 1 is a plan view of an apparatus embodying the invention;

Figure 3 is a side elevation partly in section;

Figure 4 is a sectional detail on line 4—4 of Figure 3;

Figure 5 is a section on line 5—5 of Figure 3, and

Figure 6 is a section on line 6—6 of Figure 3.

Figures 1, 2:
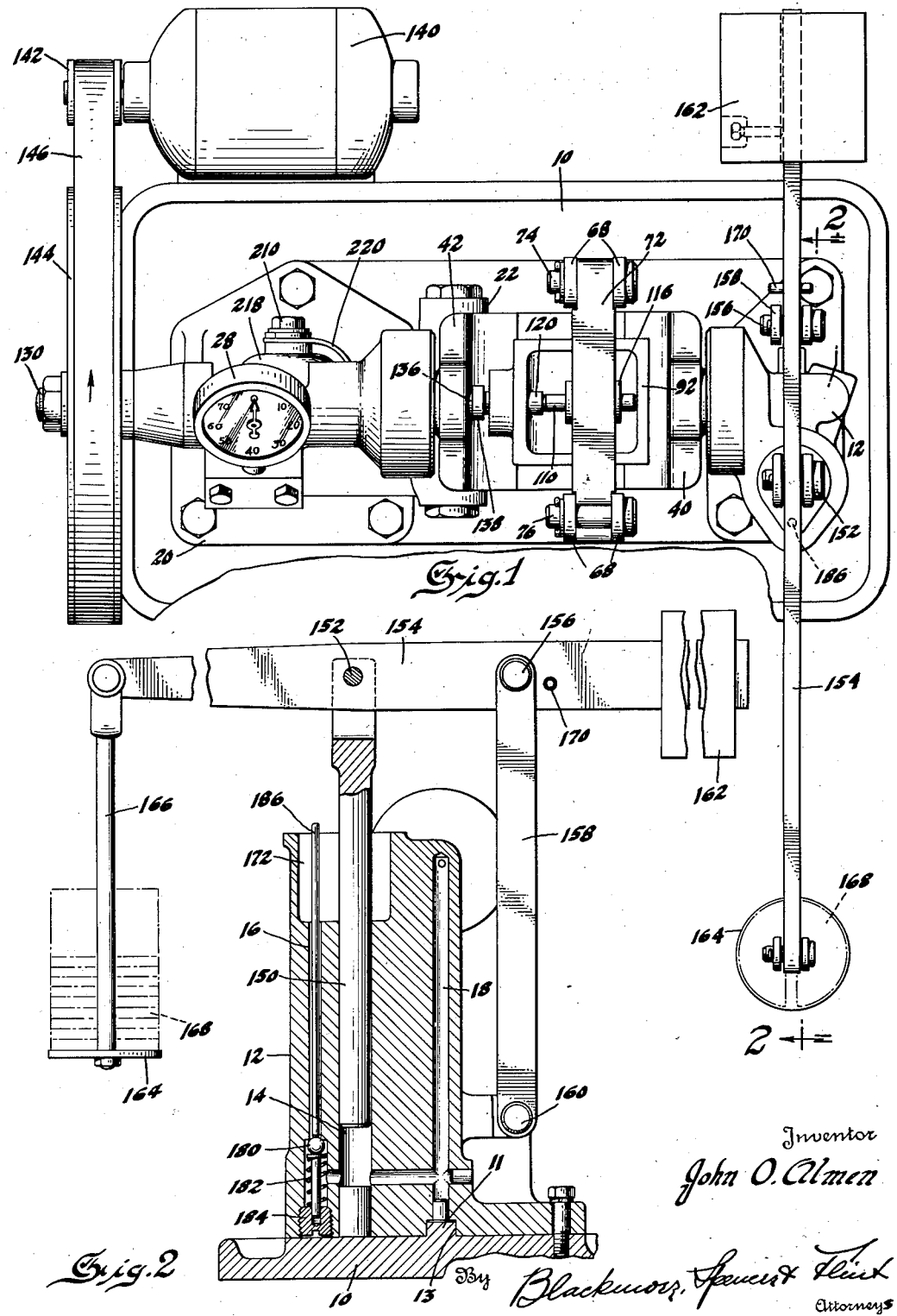
Figure 2 is a transverse section substantially in a plane indicated by line 2—2 of Figure 1.

In the drawings 10 indicates a base for supporting the apparatus. At one end of the base (Figures 1 and 3) there is secured a pillar 12 formed with a cylinder bore 14 for receiving oil or other liquid, a filling duct or passage 16 (Figure 2) for admitting liquid to the cylinder and an outlet passage 18 for liquid displaced in the cylinder by a piston slidable therein. Pillar 12 constitutes one supporting means for a swingable member to be described and also part of an hydraulic press, to be further described, for applying measured quantities of force to the parts in rubbing contact in order to increase friction during the progress of a test. At that end of base 10 opposite that at which pillar 12 is secured is another pillar 20 formed with an hydraulic cylinder 22 (Figures 1, 3 and 6) communicating with a replenishing reservoir 24 for liquid, and an outlet passage 26 in communication with a pressure gage 28 mounted on the pedestal 20 for a purpose to be disclosed. Pillar 20 also serves as another supporting means for the swingable member referred to and as part of an hydraulic force transmitting mechanism to be more fully described.

Pillar 12 (Figure 3) supports an anti-friction bearing 30, and pillar 20 supports an anti-friction bearing 32 disposed in axial line with bearing 30. Pillar 20 is also provided with other spaced bearings shown as plain bearings 34 and 36 axially alined with bearings 30 and 32. Pillar 12 is provided with a groove 13 in the under surface (Figure 2) coacting with a guide rib 11 on the base to aline the bearing 30 with bearing 32 during assembling.

Bearings 30 and 32 support a swingable table and torque transmitting member, which also functions in cooperation with pedestal 12 and other means to be described, as part of an hydraulic press mechanism. The swingable table 44 has spaced apart arms 40 and 42 extending upward. Alined trunnions 46 and 48 projecting from the arms 40 and 42 are centered, respectively, in the bearings 30 and 32. Extending downward from the bottom of table 44 is a piston 50. A passage 52 concentric with the exterior bearing surface of trunnion 46 extends thru the latter axially into communication with a passage 54 in arm 40, the passage 54 communicating with a passage 56 extending obliquely to the pressure end of piston 50. Passage 52 is brought into communication with passage 18 in pedestal 12, before mentioned, by means of a tube 58 which fits snugly in passage 52 in trunnion 46, and into the alined passage in pedestal 12, thus bridging the space between the end of the trunnion and the adjacent surface of the pedestal. Of course the tube 58 must be rotatable either in the trunnion or pedestal or both in order not to interfere with free swinging movement of table 44 and attached parts.

Piston 50 is fitted into a bore or chamber 60 formed in a slidable cylinder body 62. A cross bar 64 is secured to the bottom of cylinder body 62 as by bolt 66. Cross bar 64 lies transversely of the axial line of trunnions 46 and 48, its ends projecting, as shown in Figure 5, beyond the sides of the cylinder body. As illustrated, the lower ends of a pair of links 68 are pivoted as at 70 to each end of cross bar 64. The upper ends of said links are connected to a pressure yoke 72, by pins as at 74 and 76 which may be removable, pin 76 being seated in an open-sided notch in the yoke so that the links at that side of the quadrilateral pressure transmitting frame thus formed may be swung inward into engagement with the yoke without withdrawing pin 76. Yoke 72 is provided with a dependent pressure member 78 formed in the construction illustrated with a cylindrical groove 80 having its axis parallel with the axis of trunnions 46 and 48.

The upper face of table 44 comprises a plane supporting surface bounded by parallel shoulders or guides 90 extending transversely of the axis of trunnions 46 and 48. Said plane surface is for the purpose of supporting and positioning a container 92 adapted to receive a set of test elements, consisting of bearing parts and test arbor, immersed in a quantity of oil the lubricating properties of which are to be tested. In the illustrated structure a seat 94 rises slightly upward from the bottom of the container, this seat having a groove 96 similar to groove 80 in pressure yoke 72, for receiving a bearing element. The container wall at one end is formed with a hole 100 in axial alinement with the axis of groove 96, receiving a bushing 102 of cork or other material suitable to function as a packing as well as a bearing.

The elements to run in rubbing contact one with the other, immersed in oil to be tested, consist of a pin or arbor 110 formed at one end into a flat parallel sided coupling part 112, and two parti-cylindrical half-bearings 114 and 116, each constituting a segment slightly less in cross section than half of a cylinder. Half-bearing 114 is to be seated in the groove 96 of seat 94, pin or arbor 110 resting in it, while half bearing 116 is to be disposed upon said pin or arbor to receive pressure applied to it by yoke 72, the parti-cylindrical pressure face 80 of which is adapted to fit the back of half bearing 116. Bearing half 116 may have a small cavity sunken in its convex side to receive a small pin projecting from the center of groove 80 in the pressure yoke for the purpose of permitting accurate adjustment and preventing displacement of the bearing half when yoke 72 rests upon it. A short shaft section 120 is mounted to rotate in bushing 102. Shaft section 120 is formed at one end with a notch 122 having parallel flat sides adapted to interlock with coupling end 112 of pin or arbor 110 so that rotation of shaft section 120 will rotate the pin or arbor. The other end of shaft section 120 is formed with a flat-sided coupling end 124 the sides of which are parallel with the sides of the notch 122. A main driving shaft 130 is rotatably mounted in bearings 34 and 36, a flange 132 thereon preventing endwise movement in a direction away from shaft section 120 to which it may be coupled by means of a coupling notch 134 at the end of a reduced section 136, which has clearance in journal 48. A reinforcing ring 138 may be used to strengthen the coupling end of shaft section 136. The reduced and parallel sided end-coupling 112 of arbor 110 is of course weaker than the body of the arbor and is weaker than any of the other coupling elements in the driving line.

Main shaft 130 may be rotated at a definite velocity by means of a prime mover such as electric motor 140, the armature shaft of which may be belted or otherwise geared to shaft 130. In the illustrated embodiment (Figure 1) a small pulley 142 is secured to the armature shaft and a relatively large pulley 144 is secured to shaft 130, driving belt 146 passing around both pulleys.

In order that the bearing halves 114 and 116 may be pressed against the test arbor 110 by a force of predetermined magnitude, or may have the force increased by definite increments at definite intervals, a ram or piston 150, to the upper end of which is attached a loading means (Figures 1, 2 and 3), is fitted within cylinder 14 of pedestal 12. The upper end of piston 150 is pivotally connected, as at 152, to a beam 154 fulcrumed at 156 to a strut-like support 158 pivoted to the pedestal at 160. Support 158 may consist of parallel bars or a single forked bar. On one end of beam 154 a counterweight 162 is adjustably mounted. From the end of beam 154 opposite the counterweight, a weight holder 164 is pivotally suspended by a rod or bail 166, said weight holder being adapted to receive weights 168. When there are no weights 168 on holder 164 the counterweight 162 should be so adjusted as to balance the beam on its fulcrum 156. Stop pin 170 serves to limit the distance piston 150 may be raised when, for instance, the interconnected chambers and ducts of the pressure mechanism are to be filled with oil or other pressure transmitting liquid. Said chambers and ducts may be filled by pouring liquid into the reservoir 172 shown in Figure 2 at the upper end of pedestal 12 in communication with the inlet duct 16, and disposed so that piston 150 operates thru it. Duct 16 is normally closed by a ball check valve 180 opening downward and urged upward by spring pressed thrust pin 182 having a head at its upper end guided in an enlarged bore beneath the ball valve while the lower end of the pin is guided in an axial hole in a plug 184. A valve control rod 186 rests on top of the valve 180, its upper end projecting above the top of filling chamber 172. The rod is of course of materially less area than duct 16 in cross section. Oil or other liquid in the chamber may be admitted past the valve by pressing down upon control rod 186. By loading one end of beam 154 with one or more weights 168, the ram or piston 150 will be forced down and displace liquid in cylinder 14 forcing it through passages 18, 52, 54 and 56 into cylinder chamber 60. The multiplied pressure in cylinder chamber 60 will force cylinder body 62 downward carrying with it pressure bar 72 and applying the multiplied force to the bearing members 114, 116 and test arbor 110. The pressure mechanism illustrated as an example is so designed that one two-pound weight placed on the weight support 164 will exert 128 pounds of pressure on the test arbor and bearing assembly.

It will be understood that test arbor 110 rotating in half bearings 114, 116 under pressure, will transmit torque to the pendant swinging member comprising table 44, piston 50 attached cylinder body and frame in proportion to the frictional resistance between the arbor and the bearing members, since the bearing members are clamped to the swinging member by the pressure yoke 72. So by measuring the torque transmitted through the swinging table when a given oil in container 92 submerges the test arbor the lubricating quality of that oil may be compared with a standard or with any other oil.

Deflection of the swinging member in the illustrated apparatus due to torque transmitted from test arbor to bearings transmits force to a liquid such as oil confined in ducts, to the fluid pressure gauge 28 heretofore mentioned, which may be of any suitable construction. The gauge is subject to the pressure of oil or other liquid confined in ducts 27 and 26 formed in pedestal 20. Duct 26 as before stated, communicates with cylinder 22. In the cylinder 22 is a double acting piston 190, notched in the middle as at 192 to receive the lower end 194 of a downward projecting rigid arm 196 secured to the underside of table 44. In the apparatus shown, main shaft 130, rotating in a counterclockwise direction during a test, as viewed from the left of Figures 1 and 3, would exert a force tending to swing table 44 and arm 196 counterclockwise, the arm 196 swinging to the left as viewed in the detail shown in Figure 6, thus applying pressure to the liquid confined in the cylinder at the left end of the piston whence pressure would be transmitted thru the passageway to the pressure gauge. The space in cylinder 22 at the other end of piston 190, opposite the space that communicates with passage 26, is connected with the filling reservoir 24 by a small duct or by-pass 198 to give a dash pot control of the movements of the piston. Should air or vacuum enter into passages on the pressure or gauge side of the piston, oil or other pressure transmitting liquid can be admitted from reservoir 24 by rocking the swinging member clockwise while the apparatus is not operating, and thus moving the pressure end of the piston to the right as shown in Figure 6 enough to uncover the duct shown at 200, or otherwise moving the piston far enough backward to open communication between reservoir 24 and the cylinder on the pressure side of the piston.

To measure and audibly signal time intervals during running of a test a gong or other device for giving an audible signal is mounted on pedestal 20. As shown in Figure 3, this audible signaling device is mounted beneath shaft 130 in a space provided in the pedestal. Numeral 210 indicates a stub shaft fixed to the pedestal; 212 a worm gear rigid with a hub or sleeve 214 which is rotatable on the stub shaft; 218 a gong and 220 an elastic striker, both secured to hub 214 so as to rotate therewith. Gear 212 is in mesh with a worm 216 on shaft 130. The striker 220 is provided with a lip 222 so disposed beyond the edge of the gong that once each revolution it rides over the end of a camming post 224 projecting from the pedestal into its path. The camming post causes the elastic striker to move away from the gong and the elasticity of the striker causes it to rebound against the gong as it passes over the cam.

Of course a number of sets of test arbors and bearing parts are kept available. The arbors should be of similar materials, and so should the bearing parts. Arbors may be of drill rod steel and bearing parts of ordinary soft steel.

In running a test the two half-bearings should be assembled with test arbor 110 on the seat 96 in container 92; shaft section 120 coupled to test arbor, and container slid or placed into position so that shaft section 120 may be coupled to main shaft 130. Before placing the assembly in position links 68 should have been disconnected from yoke 72 which should have been swung upward thus permitting the container 92 to be positioned. Yoke 72 then should have been brought down into contact with half bearing 116 and links 68 secured to it. Oil to be tested sufficient to cover the test arbor in whole or part, should be placed in the container. Weight holder 164 should now be free of weights so that yoke 72 exerts substantially no downward pressure on the arbor and bearing assembly. The motor may now be started to rotate shaft 130 and, therefore, test arbor 110 at a speed of, say, 600 R. P. M. The arbor should be thus run without substantial downward bearing pressure on it for about 30 seconds. The gong is constructed and arranged to strike, say, at 10 second intervals with the main shaft rotating at 600 R. P. M. After a run of 30 seconds without load for the purpose of distributing oil over the rubbing surfaces, a single weight should be placed upon holder 164; and every ten seconds—at each sound of the gong—an additional weight should be superimposed until all of the weights (fifteen in number in this example) are loaded upon the beam, if before that time the weak coupling end 124 of the test arbor has not broken. The test is completed when the arbor breaks or when all fifteen weights have been loaded upon the beam. If the arbor breaks it is because the lubrication is not adequate to prevent seizure, and the gauge reading at the movement of breakage indicates that the oil being tested is lacking in lubricating ability for rubbing parts subjected to the load on the test assembly at that time. But, if the arbor passes the complete test without breaking or exhibiting marks of galling or scoring the indication is that the oil lubricates under the load imposed. The various readings of the gauge in comparative tests are measures of the relative excellence in lubricating quality of the oils tested under similar pressures.

Having described one embodiment of my invention and the mode of operating it, what I claim is:

1. In apparatus for testing lubricant, the combination of bearing means and a test arbor rotatable therein adapted to receive lubricant on their juxtaposed surfaces; a driving shaft; a suspended table swingable about the axis of the arbor and driving shaft, said table having means for supporting the bearing in axial alignment with the driving shaft; means for coupling the driving shaft and test arbor; means movable with the table for loading the bearing and arbor transversely of the axis of the latter; and means responsive to the movement of said table and loading means in the direction of movement of the driving shaft for measuring the frictional force between arbor and bearing.

2. In apparatus for testing lubricants, the combination of a supporting means, a swingable table suspended on the supporting means, a container adapted to be mounted on the table, said container having a seat for supporting a bearing in axial alinement with the axis about which the table may swing; a driving shaft, means for coupling a test arbor within said container to said driving shaft, means moving with said table for applying pressure to said arbor and bearing transversely of the axis of the test arbor; and means responsive to the movement of the table in the direction of movement of the driving shaft for measuring the frictional force between arbor and bearing.

3. In apparatus for testing lubricants, the combination of a supporting means, a swingable table suspended on the supporting means, a container removably mounted on the table, said container having a seat for supporting a bearing member in axial alinement with the axis about which the table may swing, a driving shaft in line with said axis, a shaft section rotative in one wall of the container adapted to aline with the driving shaft, said shaft section having a coupling element at one end adapted to be coupled with the driving shaft and a coupling element at the other end adapted to be coupled with a test arbor, means swinging with said table for applying pressure to a bearing and test arbor within said container transversely of the axis of the test arbor, and means responsive to movement of the table in the direction of rotation of the driving shaft for measuring the frictional force between arbor and bearing.

4. In apparatus for testing lubricants, the combination of a supporting means having alined bearings, a swingable table having spaced trunnions seated in said bearings by which the table is suspended; means for supporting a test assembly of arbor and bearing on the table between said trunnions and in axial alinement therewith; means for rotating the test arbor; an expansible chamber fluid pressure mechanism carried by the under side of the table; a pressure device above the table arranged to swing therewith and to be operated by the fluid pressure device to apply pressure to said test assembly, and means for forcing fluid into said expansible chamber to operate the pressure device.

5. In apparatus for testing lubricants as defined in claim 4, said expansible chamber fluid pressure mechanism comprising a piston rigid with the table, and a cylinder surrounding said piston to which the pressure device is operatively secured.

6. In apparatus for testing lubricants as defined in claim 4; means for forcing fluid into said expansible chamber, comprising a cylinder and plunger, there being a duct leading from the plunger cylinder thru the axis of one of the trunnions of the table to the expansible chamber supported by said table, and means for loading the plunger to vary the pressure exerted thereby.

7. In apparatus for testing lubricants as defined in claim 4, means for forcing fluid into said expansible chamber comprising a pedestal on the supporting means having a bearing for one of the trunnions of the table, said pedestal having formed therein a cylinder bore, a pressure duct leading therefrom to the bearing, and said table having a duct leading axially thru the trunnion in communication with the duct in the pedestal and thru the table to said expansible chamber; said pedestal having also a check valve controlled inlet to the cylinder bore in the chamber; a plunger in the cylinder bore of the pedestal; means for loading the plunger to vary the pressure exerted thereby, and a device operable on the check valve to enable it to be unseated at will.

8. In apparatus for testing lubricants, the combination of fixed supporting means, a driving shaft and a swingable support on the fixed supporting means, means for mounting a test assembly consisting of a test arbor and bearing on the swingable support with the axis of the test arbor coaxial with the swing axis of the swingable support; means movable with the swingable support for applying pressure to the bearing; a pressure indicator; means for transmitting fluid pressure to the indicator comprising a double-ended cylinder, a piston, one end of the cylinder being connected by a duct to said pressure indicator and the other end vented so as to function as a dashpot, said cylinder being in communication between its ends with a supply reservoir, and means moving with the swingable support for actuating said piston.

9. In apparatus for testing lubricants, the combination of fixed supporting means, a driving shaft and a swingable support on the fixed supporting means, means for mounting a test assembly consisting of a test arbor and bearing on the swingable support with the axis of the test arbor coaxial with the swing axis of the swingable support; means movable with the swingable support for applying pressure to the bearing and test arbor; a fluid pressure indicator and means for transmitting fluid pressure to the indicator comprising a double-ended cylinder having an open supply chamber extending upward between its ends, a double-ended piston slidable in the cylinder, an operating arm carried by the swingable support, extending thru said open supply chamber and engaging the piston, one end of said cylinder communicating by a duct with the pressure indicator and the other end vented so as to function as a dashpot in cooperation with the piston.

10. In apparatus for testing lubricants, a driving shaft, a supporting table, a lubricant container slidable on the table transversely of the axis of the driving shaft, a seat for a bearing disposed within the container, a shaft section within one wall of the container alinable with the driving shaft when the container is slid into proper position on the table, and means for coupling the driving shaft and a test arbor to said shaft section.

11. In apparatus for testing lubricants, a driving shaft, a supporting table having a guideway extending transversely of the driving shaft axis, a lubricant container slidable in the guideway, a seat for a bearing disposed within the container, a shaft section within one wall of the container alinable with the driving shaft when the table is slid transversely into appropriate position, and means for coupling the shaft section to the driving shaft and to a test arbor.

12. A combination as defined in claim 11 wherein the driving shaft and shaft section are provided with cooperating coupling elements consisting of substantially parallel flat-sided coupling jaws adapted to be interlocked by a lateral sliding movement of said container.

JOHN O. ALMEN.